Jan. 2, 1962 — H. E. LINDBLOOM — 3,015,143
MACHINE FOR CUTTING TILE PIPE
Filed March 14, 1957 — 6 Sheets-Sheet 1

Inventor,
Henry E. Lindbloom,
By Schneider, Dressler & Goldsmith, Attys.

Jan. 2, 1962 H. E. LINDBLOOM 3,015,143
MACHINE FOR CUTTING TILE PIPE
Filed March 14, 1957 6 Sheets-Sheet 3

Fig. 3

Inventor
Henry E. Lindbloom
By: Schneider, Dressler & Goldsmith
Attys.

Jan. 2, 1962 H. E. LINDBLOOM 3,015,143
MACHINE FOR CUTTING TILE PIPE
Filed March 14, 1957 6 Sheets-Sheet 4

Inventor,
Henry E. Lindbloom,
By: Schneider, Dressler & Goldsmith
Attys.

Jan. 2, 1962     H. E. LINDBLOOM     3,015,143
MACHINE FOR CUTTING TILE PIPE Filed March 14, 1957     6 Sheets-Sheet 6

Inventor,
Henry E. Lindbloom,
By: Schneider, Dressler & Goldsmith
Attys.

United States Patent Office 3,015,143
Patented Jan. 2, 1962

3,015,143
MACHINE FOR CUTTING TILE PIPE
Henry E. Lindbloom, Tulsa, Okla., assignor to American-Marietta Company, a corporation of Illinois
Filed Mar. 14, 1957, Ser. No. 646,027
13 Claims. (Cl. 25—107)

This invention relates to a machine for angularly cutting straight pipe sections of uncured tile to facilitate the fabrication of pipe sections having an integral tubular extension intermediate its ends.

The present invention will be discussed particularly in connection with T-shaped pipe sections, but it will be understood that the tubular extension may extend from the straight pipe section at any desired, predetermined angle.

In accordance with the invention, a plurality of straight pipe sections of uncured tile of uniform size are successively placed in a cutting guide frame, which may be in the form of an open top trough or similar supporting member adapted to hold the pipe sections against displacement during the cutting operation.

Two cutting wires are then forced downwardly through the pipe section of uncured tile which is positioned in said cutting guide frame. The cutting wires are moved along intersecting lines to provide angular cuts which intersect in the horizontal median plane of the pipe section. The angular cuts preferably slope toward each other at an angle of 45° to the horizontal median plane through the center of the pipe section to form a V-shaped notch having its apex in the median plane. Both angular cuts are made simultaneously, and the cutting wires are automatically retracted along the diagonal cutting lines.

As soon as the cutting wires return to their initial positions a new pipe section of uncured tile is manually pushed into one end of the cutting guide frame, thereby forcing the notched pipe section out of the opposite end of the cutting guide frame. Preferably an open top trough is positioned in front of the cutting guide frame. The trough is aligned with the guide frame and its inner surface is flush with the inner surface of the guide frame so that a pipe section positioned in the trough can be pushed longitudinally into the cutting guide frame. The alignment of the trough and cutting guide frame speeds up the cutting operation by permitting one pipe section to be placed in the trough while another pipe section is being cut. A pipe section may be positioned in the cutting guide frame much quicker from an adjacent trough than from a source requiring separate handling of the pipe section.

The notching operation described above is repeated on an uncured, notched pipe section to form two insert sections from the single length of notched pipe. A notched pipe section is rotated through an angle of 180° to position the notch on the bottom of the pipe section. The apex of the notch is positioned in the horizontal median plane of the pipe section. The cutting operation is then repeated from the diametrically opposite side of the tile. The pipe section is in the same longitudinal position, relative to the cutting wires, for the second cutting operation as for the first, and the apex of the second V-shaped notch meets the apex of the first notch to cause a complete severance of the pipe section to form two insert sections.

The insert sections are preferably of the same length, and each has one straight end and one angular end. The shape of the angular end of each insert section is complementary to the V-shaped notch so that each angular end will fit snugly within the V-shaped notch in any of the notched pipe sections. When the insert section is positioned within the V-shaped notch of a notched pipe section, cement is applied around the joint between the meeting edges of the two sections. The cement has two functions in the fabrication of the T-shaped pipe section. It prevents the possibility of any voids along the joint between the meeting edges of the insert section and the notched pipe section, and also minimizes the possibility of accidental displacement of the insert section from its proper position in the notch of the notched pipe section before the tile is fired.

The structure by means of which the above mentioned and other advantages of the invention are attained will be described in the following specification, taken in conjunction with the accompanying drawings, showing a preferred illustrative embodiment of the invention, in which.

Figure 1:
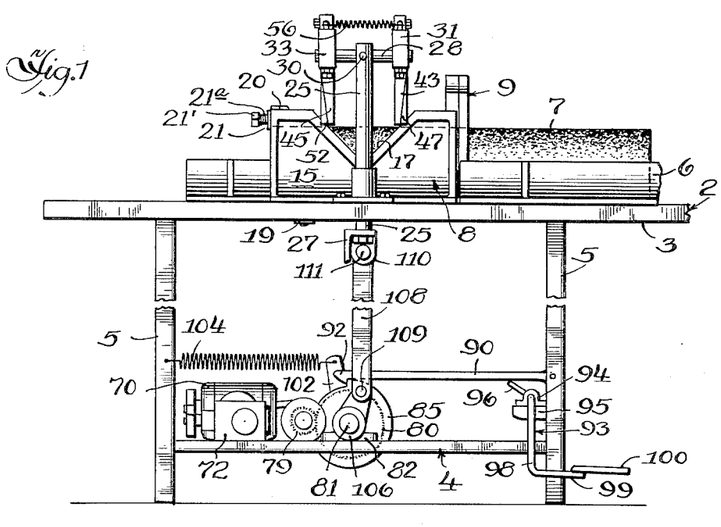
FIG. 1 is a side elevation of a machine embodying the invention, the feed end of the machine being shown on the right hand side of the figure.
Figure 2:
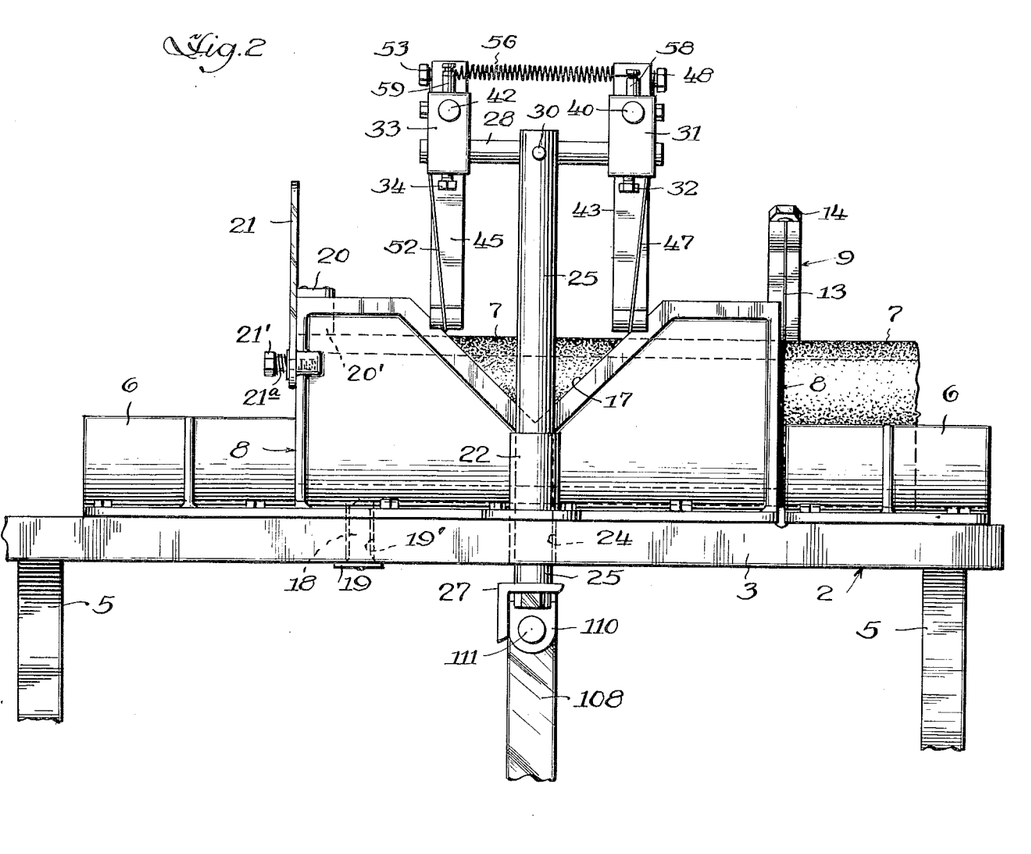
FIG. 2 is an enlarged fragmentary side elevation of the portion of the machine positioned above the table top, the operating mechanism below the table top being omitted.
Figure 3:
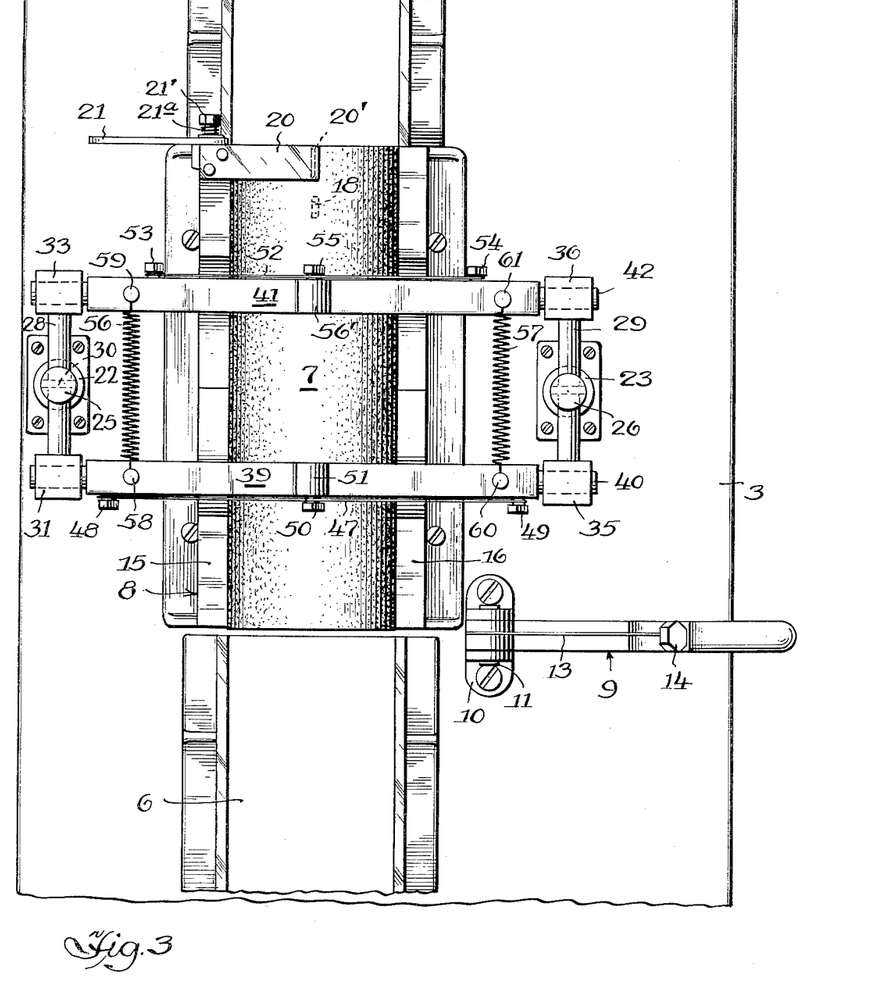
FIG. 3 is a fragmentary top plan view of the machine, the feed end of the machine being at the bottom of the figure.

Referring to FIG. 1, the reference numeral 2 indicates a work table having a top 3 and a lower platform 4 each of which is supported by a plurality of upstanding vertical legs 5. An open top trough 6 is secured to table top 3 in any suitable manner to support a straight pipe section 7 which is to be cut by the apparatus hereinafter described. The machine is adapted to cut tile only when it is in the green, or uncured state, and the pipe sections are cured after they have been removed from the machine and shaped or assembled into final form.

Intermediate the length of trough 6 a V-shaped cutting guide frame 8 is positioned in the area where the cutting operation is performed. The lower portion of the inner wall surface of guide frame 8 is flush with the inner wall surface of trough 6 so that the pipe section may be moved smoothly from the feed end of the trough to the cutting guide frame, and thereafter through the discharge end of the trough. The feeding of the pipe sections through trough 6 is intermittent, rather than continuous, since each pipe section must remain stationary, relative to the cutting guide frame 8, during the cutting operation. If it is desired to cut pipe sections of different diameters, the trough 6 and guide frame 8 may be removed from the table top and replaced by a trough and guide frame adapted to fit the particular pipe sections to be cut.

Preferably the guide frame 8 is of the same length as the pipe section to be cut, and the opposite ends of the pipe section are flush with the corresponding ends of the guide frame during the cutting operation. If pipe sections of other lengths are positioned in the trough, a transverse cutting knife 9 which is pivotally secured to a bracket 10, as indicated at 11, FIG. 4, may be used. The knife 9 comprises an open ended frame 12 having a cutting wire 13 stretched tautly across the open end of said frame. One end of the wire is fixed to the knife adjacent the pivot 11, and the other end is secured to a screw 14 adapted to hold the wire in taut condition. When one end of a pipe section is flush with the remote end of guide frame 8 a single stroke of knife 9 will cut the pipe section to a length equal to the length of the guide frame. The knife is also adapted to cut pipe sections of standard length into smaller sections, if desired.

The cutting guide frame 8 comprises two walls 15 and 16 adapted to extend upwardly adjacent opposite sides of a pipe section 7 positioned therein. The walls 15 and 16 extend above the top of the pipe section disposed horizontally in said guide frame and each is provided with a symmetrical V-shaped notch 17 the opposite walls of which converge at an angle of approximately 45°. The apex of each notch 17 terminates in the median plane of pipe section 7. Each notch 17 is centered longitudinally of the guide frame 8 and each edge of the side walls 15 and 16 defining the notch acts as a cam surface to guide the longitudinal movement of the cutting wires, hereinafter described, as they are forced downwardly through the pipe sections. The angular surfaces of the notches thereby define the lines along which the pipe section is cut.

A scratch pin 18 secured to the underside of table top 3, as indicated at 19, projects upwardly through a hole 19' in the table top and through a corresponding hole in the center of the cutting guide frame near one end of said guide frame. The pin 18 projects slightly above the inner surface of the cutting guide frame 8 so that each pipe section is scratched along a line parallel to its longitudinal axis as it is pushed out of the cutting guide frame. This scratch mark is of particular importance in connection with the fabrication of insert sections when pipe sections that have been notched on one side must be rotated 180° and cut again to sever the notched pipe section into two insert sections.

A gage 20 secured to the top of wall 15 has a pointed end turned down, as indicated at 20', diametrically opposite the pin 18. The pointed end 20' terminates just above the uppermost surface of a pipe section 7 positioned in the guide frame 8. A gage 21 pivotally secured to one end of the guide frame 8 adjacent the gage 20 by a screw 21' acts as a stop member to insure uniform longitudinal positioning of each pipe section 7 in the guide frame. A compression spring 21a coiled around the shank of screw 21' exerts resilient pressure against the gage 21 so that it may be moved pivotally without manipulation of the screw. The gage 21 may be moved to extend across the end of the guide frame so that it acts as a stop for a pipe section moved into the cutting guide frame, and then lifted out of the way so that the pipe section may be pushed out of the cutting guide frame by another pipe section.

When accuracy is not required in the longitudinal positioning of the pipe section, the gage 21 may be left in inoperative position, and the pipe sections may be positioned without using the gage 21. Ordinarily the use of gage 21 is not required in connection with the notching of pipe sections that are later to be used for receiving an insert section in the notch. The pipe sections may be positioned in the cutting guide frame with reasonable accuracy with only a visual check of the positioning. The small amount of variation in the longitudinal position of pipe sections when the gage 21 is not used will not affect the shape of the notch, but only its longitudinal position relative to the pipe section. The exact longitudinal position of the notch is not critical.

The gage 21 is preferably used when the pipe sections being notched are to be cut again later to form insert sections. Accurate longitudinal positioning of the pipe sections to be cut into insert sections is desirable because variations between the longitudinal positions of the notches relative to the pipe section during the first cutting operation and the second cutting operation will affect the shape of the angularly cut ends of the insert sections and may cause an imperfect fit between the end of the insert section and the notch.

When a notched pipe section is placed in the guide frame 8 for a second cutting operation its scratch line, formed by pin 18 when the pipe section is pushed out of the cutting guide frame, is aligned with the pointed end 20' of gage 20 to insure accurate rotational positioning of the pipe section at 180° from its first cutting position. The uniform longitudinal positioning of each pipe section in the guide frame and the accurate rotational alignment of the pipe section for the second cutting operation insures accurate cutting of the angular ends of the insert sections. The angular end of each insert section is shaped to accurately fit the notch of any pipe section that is cut in accordance with the present invention.

A vertical guide sleeve 22 is mounted adjacent one side of table top 3 and a similar guide sleeve 23 is mounted adjacent the opposite side of the table top. The guide sleeves 22 and 23 are positioned outside the walls 15 and 16 of guide frame 8 and are aligned transversely with the apexes of the V-shaped notches 17. Each guide sleeve projects upwardly from the table top and is aligned vertically with an opening 24 extending vertically through the table top. A plunger 25 is slidably mounted in guide sleeve 22 and a similar plunger 26 is slidably mounted in guide sleeve 23. The lower ends of plungers 25 and 26 are tied together below the table top 3 by a transverse bar 27 to insure synchronized vertical movement of the plungers.

A rod 28 extends through the upper end portion of plunger 25 longitudinally of the machine, and a similar rod 29 extends through the upper end portion of plunger 26. The rods 28 and 29 are pinned to their respective plungers 25 and 26, as indicated at 30, and move vertically with the plungers. A block 31 is rigidly secured on one end of rod 28 by means of a set screw 32 and a block 33 is rigidly secured to the other end of rod 28 by means of a set screw 34. Similar blocks 35 and 36 are rigidly secured to opposite ends of rod 29 by set screws 37 and 38. A bar 39 extending transversely between blocks 31 and 35 is rigidly mounted on a rod 40 rotatably mounted in blocks 31 and 35, and a similar bar 41 is rigidly mounted on a rod 42 rotatably mounted in blocks 33 and 36.

A pair of legs 43 and 44 extend downwardly from bar 39 and a pair of similar legs 45 and 46 extend downwardly from bar 41. The legs may be integral with their respective bars or may be rigidly secured thereto. The legs 43 and 45 are each outside the side wall 15 of frame guide 8 and the legs 44 and 46 are outside the opposite side wall 16. A cutting wire 47 extending across the space between the bottom of legs 43 and 44 extends around studs 48 and 49 projecting from one face of bar 39 and has its opposite ends secured to a screw 50 which is threaded into an ear 51 projecting upwardly from bar 39. Screw 50 may be turned to tighten the wire 47 and hold it taut. A similar wire 52 extends across the bottoms of legs 45 and 46, around studs 53 and 54, and has its opposite ends secured to a screw 55 threaded in an ear 56' projecting upwardly from bar 41.

In the uppermost position of plungers 25 and 26 the wires 47 and 52 each engage one side of both notches 17 adjacent the top edge thereof. In this position both wires lie above the uppermost surface of a pipe section 7 positioned in the cutting guide frame 8. As the plungers 25 and 26 are moved downwardly, by mechanism hereinafter described, the wires are forced downwardly to cut through the pipe section of uncured tile that is positioned in the guide frame. As the wires move downwardly through the uncured tile they follow the edges of notch 17 which act as cam surfaces, and force the wires toward each other longitudinally of the machine, the rods 40 and 42 meanwhile moving pivotally in the blocks, 31, 35 and 36, respectively, in which they are mounted. The lowermost transverse sections of wires 47 and 52 meet at the apexes of notch 17, when they are moved downwardly to their lowermost positions, thereby completely severing a V-shaped notch out of the uncured tile pipe section 7.

As the plungers 25 and 26 are moved upwardly, the legs 43, 44 are moved away from legs 45, 46 by a pair of tension springs 56 and 57 each of which has its opposite ends secured to studs 58, 59 and 60, 61, respectively. Studs 58 and 60 project upwardly from bar 39 and studs 59 and 61 project upwardly from bar 41. Tension springs 56 and 57 exert a constant force urging the upper edges of bars 39 and 41 toward each other to cause the cutting wires to follow the line of cut in the reverse direction as the cutting wires are moved upwardly. The engagement of the cutting wires with opposite edges of V-shaped notch 17 prevents the bottom ends of the legs 43, 44 and 45 and 46 from moving longitudinally past their vertical positions.

Figures 7, 8:
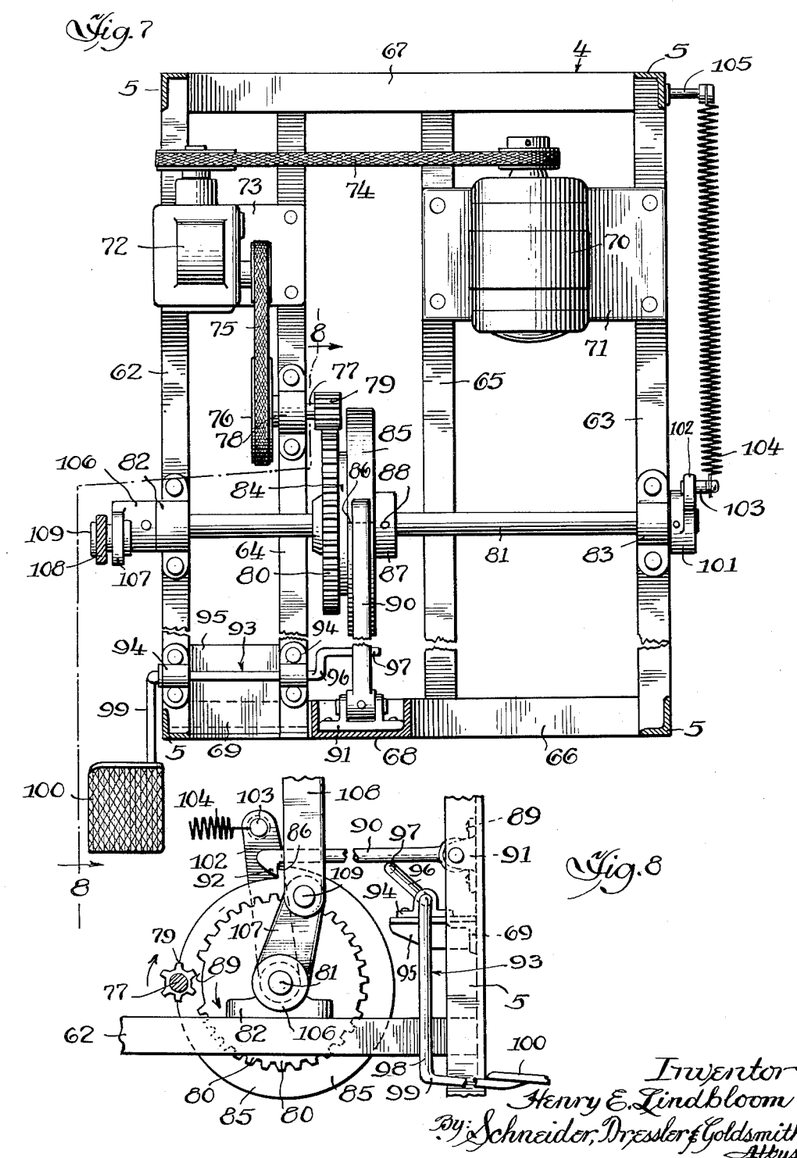
FIG. 7 is a top plan view of the operating mechanism for the machine, the feed end of the machine being at the bottom of the figure.
FIG. 8 is a cross sectional view, taken along the line 8—8 of FIG. 7.

The mechanism for reciprocating the plungers 25 and 26 will now be described. As shown in FIG. 7, the lower platform 4 of work table 2 comprises two outer longitudinal bars 62, 63, two intermediate longitudinal strips 64, 65, and transverse bars 66 and 67 connecting the opposite ends of the longitudinal bars. The bar 66 is aligned with the vertical legs 5 adjacent the feed end of the machine, and the bar 67 is aligned with the vertical legs 5 adjacent the discharge end of the machine. A channel iron 68 extends vertically upwardly from bar 66 to the underside of table top 3. An angle iron 69 having its opposite ends secured respectively to one of the vertical legs 5 and the channel iron 68 is spaced above bar 66 for a reason hereinafter disclosed.

A motor 70 is mounted on a plate 71 secured to bars 63 and 65. A gear reducer 72 is mounted on a plate 73 secured to bars 62 and 64. The gear reducer is connected to the motor by a drive belt 74. Another drive belt 75 connects the gear reducer to a pulley 76 mounted on one end of a shaft 77. The shaft 77 is rotatably mounted in a bearing 78 which is mounted on bar 64. A gear 79 is rigidly mounted on the other end of shaft 77. The gear 79 is adapted to mesh with a gear 80 rigidly secured on a shaft 81 rotatably mounted in bearings 82 and 83 mounted on bars 62 and 63, respectively. The gear 80 is part of a unit which also includes a hub 84 and a disk 85. The periphery of disk 85 is provided with a shoulder 86 for a purpose hereinafter disclosed. The unit comprising gear 80, hub 84 and disk 85 cannot move laterally on shaft 81 in one direction because of the proximity of bar 64 and gear 79. Movement of the unit in the opposite direction is prevented by a collar 87 secured on the shaft 81 by a set screw 88.

The motor 70 rotates the gear 79 constantly during its operation, but the gear 80 stops rotating after each revolution because of a gap 89 in its teeth. Every time the gap 89 becomes aligned with gear 79 gear 80 will stop, unless the inertia of the unit comprising gear 80, hub 84 and disk 85 carries the gear 80 past the point of alignment of the gap 89 with gear 79 and causes the teeth following the gap 89 to become meshed with the gear 79. The interrelationship between the gear 80 and the plungers 25 and 26 will be hereinafter described, but it may be noted that the gap 89 is so positioned that when the gear 80 is in the position in which the gap 89 is aligned with gear 79 the plungers 25 and 26 are in their uppermost positions.

A pawl 90 is pivotally supported at one end in a bracket 91 mounted in the channel iron 68. The pawl 90 has a tooth 92 normally engaging the peripheral surface of disk 85 and shaped to engage the shoulder 86 whenever the disk 85 is rotated far enough to align the shoulder with the pawl tooth. The engagement of the pawl tooth 92 with the shoulder 86 stops the rotation of the gear 80 when the gap 89 is aligned with gear 79. The weight of the pawl is sufficient to hold the pawl tooth down against the peripheral surface of the disk 85.

The means for lifting pawl tooth 92 out of engagement with shoulder 86 comprises a lever 93 pivotally mounted in a pair of brackets 94. The brackets 94 are mounted on a plate 95 supported by the angle iron 69. One end of lever 93 is offset, as indicated at 96, to position the free end 97 thereof into engagement with the underside of pawl 90. The opposite end of lever 93 is bent downwardly, as indicated at 98, and horizontally, as indicated at 99, to extend outwardly of the adjacent vertical leg 5. A foot pedal 100 is secured to the projecting end of lever 93 to facilitate manipulation thereof. Downward pressure of the foot pedal causes the end 97 to move upwardly to lift pawl 90 and disengage its tooth 92 from the shoulder 86 and thereby release gear 80 for rotation.

A collar 101 rigidly mounted on one end of shaft 81 is provided with an arm 102 having a stud 103 projecting laterally from one side. One end of a tension spring 104 is secured to the stud 103. The other end of spring 104 is secured to a stud 105 projecting laterally from the vertical leg 5 adjacent the discharge end of the machine and on the same side of the platform 4 as the collar 101. Spring 104 exerts a constant force against arm 102 urging it toward the discharge end of the machine. Accordingly, when the pawl tooth 92 is disengaged from shoulder 86 the spring 104 pulls the arm 101 toward the discharge end of the machine to rotate shaft 81 far enough to cause the teeth of gear 80 following the gap 89 to mesh with gear 79 which is constantly rotating. As soon as the gear 80 starts rotating, the foot pressure on pedal 100 is released to permit the pawl to fall back into its operative position so that the tooth 92 will engage the shoulder 86 and stop the rotation of gear 80 after one complete rotation when the gap 89 is again aligned with gear 79.

Figure 4:
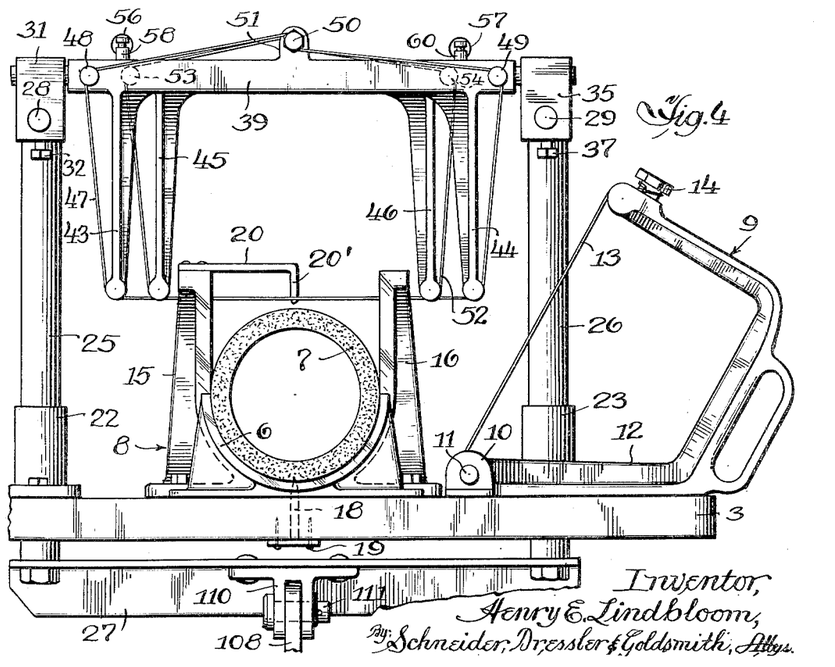
FIG. 4 is a fragmentary end elevation of the portion of the machine positioned above the table top, looking from the feed end of the machine, with the cutting wires in their uppermost position.
Figure 5:
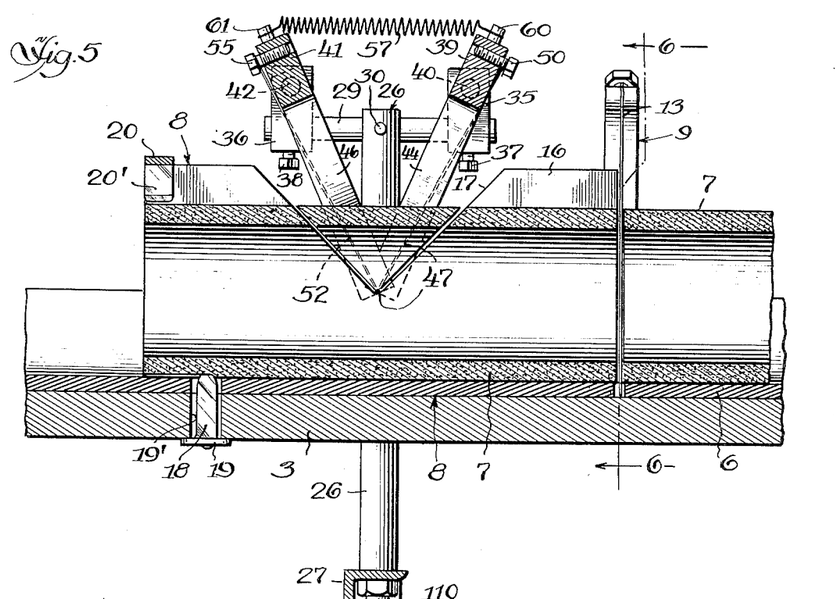
FIG. 5 is a longitudinal sectional view through the portion of the machine above the table top, with the cutting wires in their lowermost position.
Figure 6:
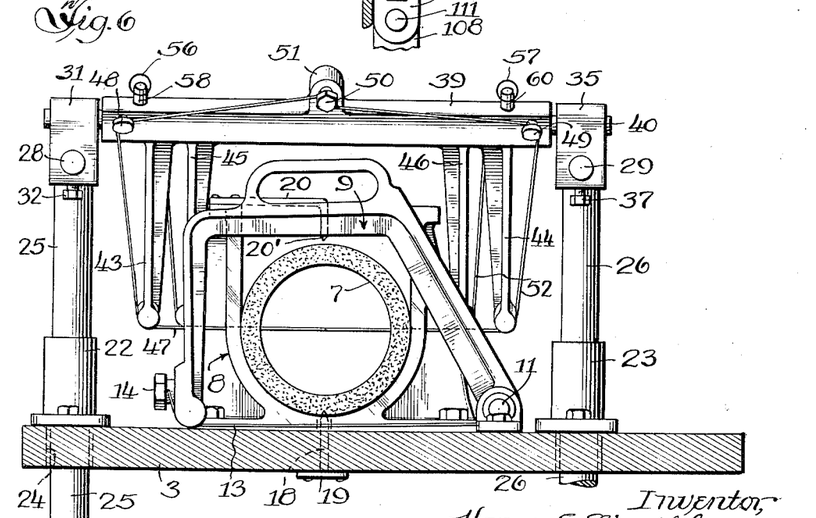
FIG. 6 is an end view, taken along the line 6—6 of FIG. 5.

A collar 106 is rigidly mounted on the other end of shaft 81 and rotates therewith. A crank 107 rigidly secured at one end to collar 106 is pivotally connected at its other end to one end of a link 108, as indicated at 109. The other end of link 108 is pivotally secured in a clevis 110 by a pin 111. The clevis is rigidly secured to transverse bar 27 (FIG. 4). The transverse bar 27 is secured to the lower ends of plungers 25 and 26. Accordingly, as crank 107 is rotated by shaft 81 it moves the pivot 109 through a circular orbit about shaft 81 as a center. The circular movement of pivot 109 reciprocates the bar 27 and the plungers 25 and 26 vertically.

Preferably the length of crank 107 from the center of shaft 81 to the center of pivot 109 is equal to one half the vertical stroke of plungers 25 and 26. Accordingly, the difference between the uppermost and lowermost positions of pivot 109 as it rotates about shaft 81 limits the vertical movement of the cutting wires 47 and 52. If it is desired to make the machine adjustable to take care of pipe sections of different diameters, the length of crank 107 is made equal to half the greatest vertical distance through which the cutting wires must move to cut a notch halfway through the largest diameter of pipe to be cut in the machine.

If pipe sections of greater diameter than pipe section 7 are to be notched in the machine, it is desirable to prevent the transverse portions of the cutting wires 47 and 52 from moving upwardly above the top of side walls 15 and 16. The springs 56 and 57 will move the wires along the top of walls 15 and 16 longitudinally beyond the outer edges of notches 17 unless the movement of the wires is restrained. The necessary restraint may be provided in various ways, such as increasing the height of the side walls 15 and 16 or providing guide posts projecting upwardly from the upper edges of the side walls adjacent the outer edges of the notches 17. The same result may be obtained by enclosing the springs 56 and 57 in sleeves that will act as spacers to limit the movement of bars 39 and 41 toward each other. It is also possible to increase the length of the sides of the clevis 110 and provide an adjustable lost motion connection between the link 108 and the clevis.

The method of making the T-shaped pipe sections may be summarized briefly as follows. A length of pipe section 7 of uncured or green tile is placed in the cutting guide frame 8 in the desired position. If the pipe section has been previously cut into the proper length it is ready for the cutting operation. If the pipe section is not previously cut to the desired length, the transverse cutting knife 9 is swung downwardly about its pivot 11 to force the cutting wire 13 through the uncured tile to cut the pipe section to the desired length.

Downward pressure applied momentarily against the foot pedal 100 lifts the pawl 90 pivotally to release tooth 92 from shoulder 86 and thereby allow the spring 104 to pull shaft 81 around far enough to cause the teeth of gear 80 following the gap 89 to engage gear 79 for one complete revolution of shaft 81. During the revolution of shaft 81 the crank 107 also completes one revolution to move plungers 25 and 26 downwardly and then upwardly. The rods 28 and 29 move with the plungers and thereby move the transverse bars 39 and 41 downwardly and upwardly. The legs 43 and 44 which depend from bar 39 outside the walls 15 and 16 of guide frame 8 carry the cutting wire 47 across the guide frame, and the legs 45 and 46 similarly carry the cutting wire 52. These cutting wires engage the longitudinally sloping walls of the notches 17 and are moved toward each other as they are forced downwardly through the pipe section 7.

Figures 9, 10, 11, 12, 13:
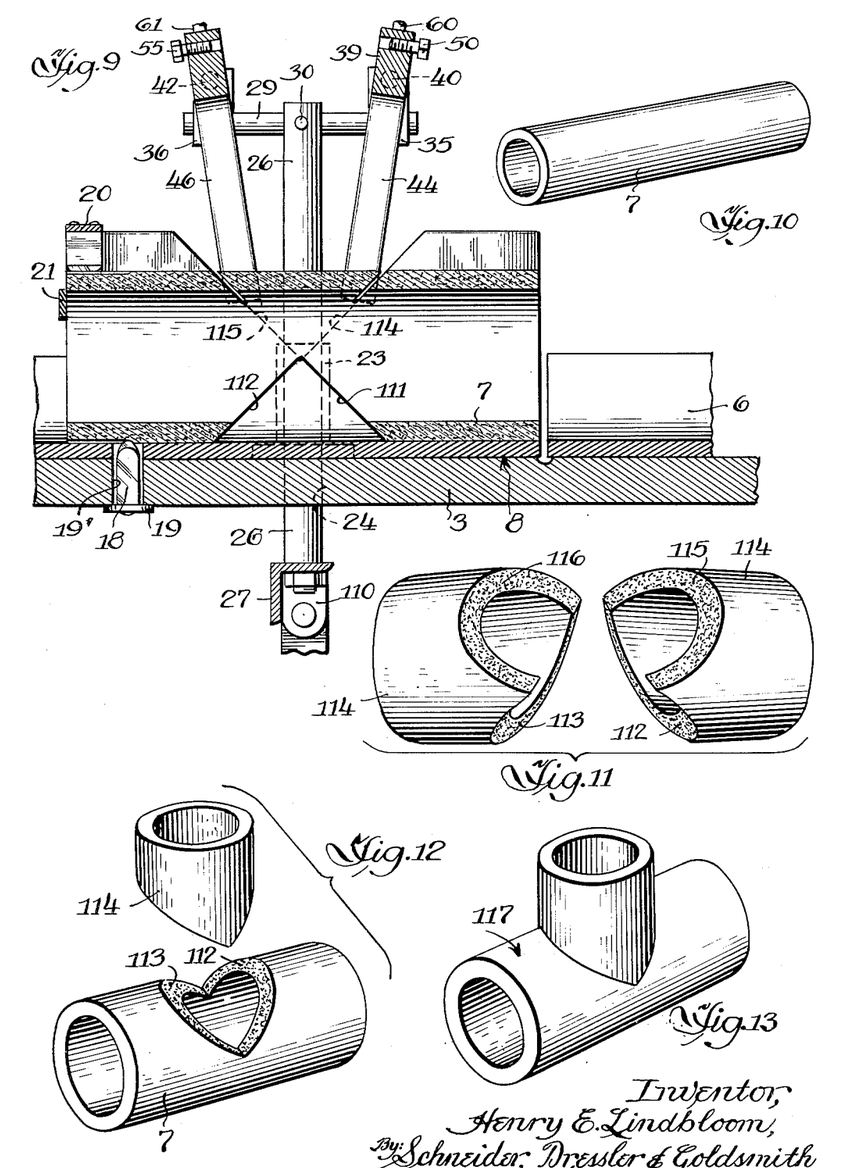
FIG. 9 is a fragmentary longitudinal sectional view showing the cutting wires after the start of the second cutting operation on a pipe section that has been previously notched and rotated through 180°.
FIG. 10 is a detail perspective view of a straight pipe section.
FIG. 11 is a perspective view showing two insert sections as they are formed from a straight pipe section.
FIG. 12 is a detail perspective view of a notched pipe section and an insert section in position for fitting into said notch.
FIG. 13 is a detail perspective view of a T-shaped pipe section.

The wires 47 and 52 meet at the apexes of the notches 17, having cut the pipe section 7 along angular lines 112 and 113 coincident to the sides of notches 17 to form a notch extending through half the diameter of the pipe section, as shown in FIG. 12. On the upward stroke of the plungers 25 and 26 the springs 56 and 57 urge the lower ends of legs 43, 44, 45 and 46 outwardly so that the cutting wires are retracted along the lines of cut. The portion of the pipe section between cut lines 112 and 113 is completely severed and is removed from the pipe section to form a notch in the pipe section. The notched pipe section is removed from the cutting guide frame 8 by positioning another pipe section 7 in the trough 6 and pushing it longitudinally into the cutting guide frame 8.

The pipe section being pushed into the guide frame pushes the pipe section that has just been notched out of the guide frame. As the notched pipe section is pushed out of the guide frame it is scratched by the pin 18 which produces an exterior scratch extending longitudinally of the pipe section. The insert sections 114 are made by cutting through a notched pipe section. A notched pipe section is placed in the cutting guide frame, pushed against the gage 21, and is rotated until the longitudinal scratch is aligned with the pointed end 20' of gage 20.

The cutting operation is repeated, and the notched tile pipe section is cut along the lines 115 and 116 to intersect the cut lines 112 and 113 of the first notch at the intersection of those lines. The second cutting operation completely severs the pipe section 7 into two insert sections. Each of the insert sections has one straight end, and one angularly cut end adapted to fit accurately into the notch formed in any pipe section by the first cutting operation.

An insert section is positioned with its angular end fitted into the notch of a notched pipe section. Cement is then applied along the joint between the angular end of the insert section and the notch of the pipe section. The T-shaped unit 117 is then placed in a furnace and fired to cure the tile. The firing fuses the tile of both sections and the cement at the joint into an integral structure.

While I have described a preferred embodiment of my invention in considerable detail, it will be understood that the description is intended to be illustrative rather than restrictive, as many details may be modified or changed without departing from the spirit or scope of my invention. Accordingly, I do not desire to be restricted to the exact details of construction described.

I claim:

1. A machine for cutting pipe sections of uncured tile which comprises a cutting guide frame adapted to receive and support a pipe section of uncured tile, a pair of vertically movable wire supporting members pivotally mounted above said frame on opposite sides of its longitudinal center and extending transversely of said frame, a pair of cutting wires secured to said supporting members and extending transversely of said guide frame adjacent the upper edge of said frame, and means for moving said supporting members and said cutting wires downwardly simultaneously to cut a pipe section positioned in said guide frame, said cutting frame having longitudinal side walls, each of said side walls having intermediate portions inclined downwardly toward its longitudinal center, each of said cutting wires being engaged by corresponding inclined portions of each side wall for guiding said cutting wires toward each other as they are moved downwardly.

2. A machine for cutting pipe sections of uncured tile which comprises a cutting guide frame adapted to receive and support a pipe section of uncured tile, a pair of cutting wires extending transversely of said guide frame above a pipe section positioned in said guide frame and on opposite sides of the transverse center of said pipe section, means for moving said cutting wires downwardly simultaneously to cut said pipe section, said guide frame comprising a pair of side walls, each of said side walls having a cam surface extending in opposite directions longitudinally of said pipe section and upwardly from a point below the upper edge of said pipe section and intermediate its length, each of said surfaces engaging each of said cutting wires to guide said cutting wires toward each other as said wires are moved downwardly.

3. A machine for cutting pipe sections of uncured tile which comprises a cutting guide frame adapted to receive and support a pipe section of uncured tile, vertically movable wire supporting members pivotally mounted above said guide frame and extending transversely thereof, a pair of cutting wires secured to said supporting members and extending transversely of said guide frame and engaging said guide frame in a horizontal plane above the uppermost surface of a pipe section positioned in said guide frame, and means for moving said wire supporting members downwardly simultaneously to move said cutting wires downwardly simultaneously to the median plane of said pipe section, said cutting guide frame having longitudinal side walls, each of said side walls having intermediate portions inclined downwardly toward each other, said inclined portions of each side wall meeting in the median plane of a pipe section supported in said cutting guide frame, said inclined portions of said walls engaging the cutting wires to guide said cutting wires toward each other as they are moved downwardly, said cutting guide frame causing said wires to meet in said median plane.

4. A machine for cutting pipe sections of uncured tile which comprises a cutting guide frame adapted to receive and support a pipe section of uncured tile, said cutting guide frame having longitudinal side walls each provided with a V-shaped notch, vertically movable wire supporting members pivotally mounted above said guide frame and extending transversely thereof, a pair of cutting wires secured to said supporting members and extending transversely of said side walls, each of said cutting wires engaging the angular portions of said side walls defining said notches on opposite sides of said notches, and means for moving said supporting members and cutting wires downwardly simultaneously, said notches guiding said cutting wires toward each other as they are moved downwardly.

5. A machine for cutting pipe sections of uncured tile which comprises a cutting guide frame adapted to receive and support a pipe section of uncured tile, said cutting guide frame having longitudinal side walls each provided with a V-shaped notch, a pair of cutting wires extending transversely of said side walls, each of said cutting wires engaging the angular portions of said side walls defining said notches, holding means positioned outside each of said side walls to hold each of said cutting wires taut, each of said holding means being pivoted to swing longitudinally of said cutting guide frame, and means for moving each of said holding means and said wires downwardly simultaneously, said notches guiding said wires toward each other as said wires are moved downwardly.

6. A machine for cutting pipe sections of uncured tile which comprises a cutting guide frame adapted to receive and support a pipe section of uncured tile, said cutting guide frame having longitudinal side walls each provided with a V-shaped notch, a pair of cutting wires extending transversely of said side walls, each of said cutting wires engaging the angular portions of said side walls defining said notches, a pair of bars extending transversely of said cutting guide frame, a pair of legs depending from each of said bars, each pair of legs straddling said cutting guide frame, each of said legs having means adjacent its lower end engaging one of said wires to hold said wires taut, said bars being pivoted to swing longitudinally of said cutting guide frame, said notches guiding said wires toward each other as said wires are moved downwardly.

7. A machine for cutting pipe sections of uncured tile which comprises a cutting guide frame adapted to receive and support a pipe section of uncured tile, a pair of cutting wires extending transversely of said guide frame, means for moving said cutting wires downwardly simultaneously to cut a pipe section positioned in said guide frame, said guide frame comprising a pair of side walls, each of said side walls having a cam surface engaging each of said cutting wires to guide said cutting wires in a predetermined path as said wires are moved downwardly, means for moving said cutting wires upwardly, and spring means to hold said cutting wires in engagement with said cam surfaces, whereby said cutting wires move along said predetermined path in the reverse direction as they are moved upwardly.

8. A machine for cutting pipe sections of uncured tile which comprises a cutting guide frame adapted to receive and support a pipe section of uncured tile, said cutting guide frame having longitudinal side walls each provided with a V-shaped notch, a pair of cutting wires extending transversely of said side walls, each of said cutting wires engaging the angular portions of said side walls defining said notches, a pair of bars extending transversely of said cutting guide frame, a pair of legs depending from each of said bars, each pair of legs straddling said cutting guide frame, each of said legs having means adjacent its lower end engaging one of said wires to hold said wires taut, said bars being pivoted to swing longitudinally of said cutting guide frame, said notches guiding said wires toward each other as said wires are moved downwardly, and spring means for pivotally moving said bars to move the legs and wires of each bar away from the legs and wires of said other bar away from each other as said wires are moved upwardly.

9. A machine for cutting pipe sections of uncured tile which comprises a cutting guide frame adapted to receive and support a pipe section of uncured tile, said guide frame comprising a pair of side walls, each of said side walls having a V-shaped notch extending downwardly from its upper edge, a pair of cutting wires extending transversely across opposite sides of said notch, a plunger operatively connected to each of said cutting wires, spring means for holding each of said wires against one side of said notch, and means for reciprocating said plunger vertically to move said wires along the sides of said V-shaped notches.

10. A machine for cutting pipe sections of uncured tile which comprises a cutting guide frame adapted to receive and support a pipe section of uncured tile, said guide frame comprising a pair of side walls each having a V-shaped notch, a pair of plungers mounted outside opposite sides of said frame, the upper end of each of said plungers extending above said side walls, a rod secured to the upper end of each of said plungers, said rods extending parallel to said side walls, a pair of parallel bars extending between said rods, each of said bars being pivotally mounted between corresponding ends of said rods, a pair of legs depending from each of said bars, each of said legs being rigidly relative to the bar from which it depends, each pair of legs straddling said frame, a cutting wire secured to each of said bars and extending from the lower end of one leg to the lower end of the other leg depending from the bar to which the wire is secured, each of said wires engaging corresponding sides of said V-shaped notches, a spring secured to said bars to hold said cutting wires against the sides of said notches, and means for reciprocating said plungers vertically to move said wires downwardly and upwardly along the sides of said V-shaped notches.

11. A machine for cutting pipe sections of uncured tile which comprises a cutting guide frame adapted to receive and support a pipe section of uncured tile, said guide frame comprising a pair of side walls, each of said side walls having a V-shaped notch extending downwardly from its upper edge, a pair of cutting wires extending transversely across opposite sides of said notches, a plunger operatively connected to each of said cutting wires, spring means for holding each of said wires against one side of said notch, a motor, means operatively connecting said motor to said plunger for reciprocating said plunger vertically to move said wires along the sides of said V-shaped notches, and means automatically disengaging said operative connecting means after said plunger has been reciprocated through one complete cycle.

12. A machine for cutting pipe sections of uncured tile which comprises a cutting guide frame adapted to receive and support a pipe section of uncured tile, said guide frame comprising a pair of side walls, each of said side walls having a V-shaped notch extending downwardly from its upper edge, a pair of cutting wires extending transversely across opposite sides of said notches, a plunger operatively connected to each of said cutting wires, spring means for holding each of said wires against one side of said notch, a motor, means operatively connecting said motor to said plunger for reciprocating said plunger vertically to move said wires along the sides of said V-shaped notches, said means for operatively connecting said motor to said plunger including two intermeshed gears, one of said gears having a gap between its teeth, said gap being aligned with said other gear when said plunger is in its uppermost position, and a pawl adapted to hold said first mentioned gear against rotation when said gap is aligned with said second mentioned gear.

13. A machine for cutting pipe sections of uncured tile which comprises a cutting guide frame adapted to receive and support a pipe section of uncured tile, said guide frame comprising a pair of side walls, each of said side walls having a V-shaped notch extending downwardly from its upper edge, a pair of cutting wires extending transversely across opposite sides of said notches, a plunger operatively connected to each of said cutting wires, spring means for holding each of said wires against one side of said notch, a motor, means operatively connecting said motor to said plunger for reciprocating said plunger vertically to move said wires along the sides of said V-shaped notches, said means for operatively connecting said motor to said plunger including two intermeshed gears, one of said gears having a gap between its teeth, said gap being aligned with said other gear when said plunger is in its uppermost position, a pawl adapted to hold said first mentioned gear against rotation when said gap is aligned with said second mentioned gear, and a spring operable to rotate said first mentioned gear to mesh it with said second mentioned gear when said pawl is released from holding engagement wtih said first mentioned gear.

References Cited in the file of this patent

UNITED STATES PATENTS

| | | |
|---|---|---|
| 268,837 | Stickney | Dec. 12, 1882 |
| 411,690 | Somerville | Sept. 24, 1889 |
| 744,363 | Kondolf | Nov. 17, 1903 |
| 945,847 | Koch | Jan. 11, 1910 |
| 957,486 | Bensing | May 10, 1910 |
| 1,162,284 | Dorn | Nov. 30, 1915 |
| 1,240,287 | Woodward | Sept. 18, 1917 |
| 1,504,645 | Rice | Aug. 12, 1924 |
| 1,570,538 | Thomas | Jan. 19, 1926 |
| 1,623,833 | Geis | Apr. 5, 1927 |
| 1,714,614 | Muma | May 28, 1929 |
| 1,834,970 | Russell | Dec. 8, 1931 |
| 1,880,872 | Denton | Oct. 4, 1932 |
| 2,721,159 | Johnston | Oct. 18, 1955 |

FOREIGN PATENTS

| | | |
|---|---|---|
| 620,260 | France | Jan. 15, 1927 |
| 212,251 | Germany | July 26, 1909 |
| 429,686 | Germany | June 2, 1926 |